US011636042B2

(12) United States Patent
Chen

(10) Patent No.: US 11,636,042 B2
(45) Date of Patent: Apr. 25, 2023

(54) DATA PROCESSING METHOD FOR IMPROVING ACCESS PERFORMANCE OF MEMORY DEVICE AND DATA STORAGE DEVICE UTILIZING THE SAME

(71) Applicant: Silicon Motion, Inc., Hsinchu County (TW)

(72) Inventor: Yu-Ta Chen, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 45 days.

(21) Appl. No.: 17/246,707

(22) Filed: May 2, 2021

(65) Prior Publication Data

US 2021/0397563 A1 Dec. 23, 2021

Related U.S. Application Data

(60) Provisional application No. 63/042,564, filed on Jun. 23, 2020.

(30) Foreign Application Priority Data

Nov. 11, 2020 (TW) .................................. 109139254

(51) Int. Cl.
*G06F 12/1009* (2016.01)
(52) U.S. Cl.
CPC .... *G06F 12/1009* (2013.01); *G06F 2212/657* (2013.01)

(58) Field of Classification Search
CPC ...................... G06F 12/1009; G06F 2212/657
See application file for complete search history.

(56) References Cited

U.S. PATENT DOCUMENTS

| 9,170,893 | B2 | 10/2015 | Okubo | |
|---|---|---|---|---|
| 2020/0057725 | A1* | 2/2020 | Cho | .................... G06F 12/0246 |
| 2020/0065259 | A1 | 2/2020 | Byun | |
| 2020/0334167 | A1* | 10/2020 | Byun | .................. G06F 12/0246 |

FOREIGN PATENT DOCUMENTS

| TW | I486767 B | 6/2015 |
|---|---|---|
| WO | 2019/209707 A1 | 10/2019 |
| WO | 2019/222381 A1 | 11/2019 |

\* cited by examiner

*Primary Examiner* — Gary W. Cygiel
(74) *Attorney, Agent, or Firm* — Winston Hsu

(57) ABSTRACT

A data storage device includes a memory device and a memory controller. The memory controller is configured to configure a predetermined memory block as an active memory block to receive data from a host device and update content of a sub-region bit table in response to a write operation of the active memory block. The sub-region bit table includes one or more bits, each bit is associated with one or more sub-regions and a value of each bit is initially set to a default value. When data of a first logical address received from the host device is written in the active memory block, the memory controller is configured to determine which sub-region the first logical address belongs to and set the value of the bit associated with the sub-region that the first logical address belongs to to a predetermined value different from the default value.

14 Claims, 8 Drawing Sheets

| Content from Table 2(4 Bytes) | Content from Table 1(4 Bytes) |
|---|---|

FIG. 5

DATA PROCESSING METHOD FOR IMPROVING ACCESS PERFORMANCE OF MEMORY DEVICE AND DATA STORAGE DEVICE UTILIZING THE SAME

CROSS REFERENCE TO RELATED APPLICATIONS

This application claims the benefit of U.S. Provisional Application No. 63/042,564 filed 2020 Jun. 23, the entirety of which is incorporated by reference herein.

BACKGROUND OF THE INVENTION

1. Field of the Invention

The invention relates to a data processing method for effectively improving access performance of a memory device and the associated data storage device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

In order to assist access operations of the data storage device, one or more mapping tables configured to record mapping relationships between physical addresses and logical addresses are established and maintained by the data storage device. The logical addresses are the addresses mainly utilized by a host device coupled to the data storage device. The host device uses the logical addresses to identify different memory spaces. The physical addresses are the addresses mainly utilized by the data storage device. The data storage device uses the physical addresses to identify different memory spaces. The memory controller manages the mapping tables based on the access operations of the data storage device.

In response to a read command carrying a logical address that the host device attempts to read, the memory controller has to look up the mapping table to retrieve the physical address which actually stores the data of the logical address to be read. However, to lookup or search in the table is a time consuming operation. In addition, the table size usually increases as the memory size of the memory device increases. Therefore, the time required for looking up or searching in the mapping table increases enormously when the size of the mapping table grows.

To solve this problem and to improve the read speed of the memory device, a data processing method for effectively processing data stored in the memory device and improving the access performance of the memory device is highly required.

SUMMARY OF THE INVENTION

It is an objective of the invention to solve the time consuming problem of looking up or searching in the mapping table.

According to an embodiment of the invention, a data storage device comprises a memory device and a memory controller. The memory device comprises a plurality of memory blocks. The memory controller is coupled to the memory device and configured to access the memory device. The memory controller is configured to configure a predetermined memory block as an active memory block to receive data from a host device and update content of a sub-region bit table in response to a write operation of the active memory block. The sub-region bit table comprises one or more bits, each bit is associated with one or more sub-regions and a value of each bit is initially set to a default value. When data of a first logical address received from the host device is written in the active memory block, the memory controller is configured to determine which sub-region the first logical address belongs to and set the value of the bit associated with the sub-region that the first logical address belongs to to a predetermined value different from the default value.

According to another embodiment of the invention, a data processing method for a data storage device comprising a memory device and a memory controller is provided. The memory device comprises a plurality of memory blocks which comprising at least an active memory block configured to receive data to be written in the memory device from a host device. The memory controller is coupled to the memory device and configured to access the memory device. The data processing method is performed by the memory controller and comprises: writing data of a first logical address in the active memory block; and updating content of a sub-region bit table in response to the write operation of the active memory block, wherein the sub-region bit table comprises one or more bits, each bit is associated with one or more sub-regions and a value of each bit is initially set to a default value. The step of updating the content of the sub-region bit table in response to the write operation of the active memory block further comprises: determining which sub-region the first logical address belongs to; and setting the value of the bit associated with the sub-region that the first logical address belongs to to a predetermined value different from the default value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram showing an exemplary format for an HPB entry.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
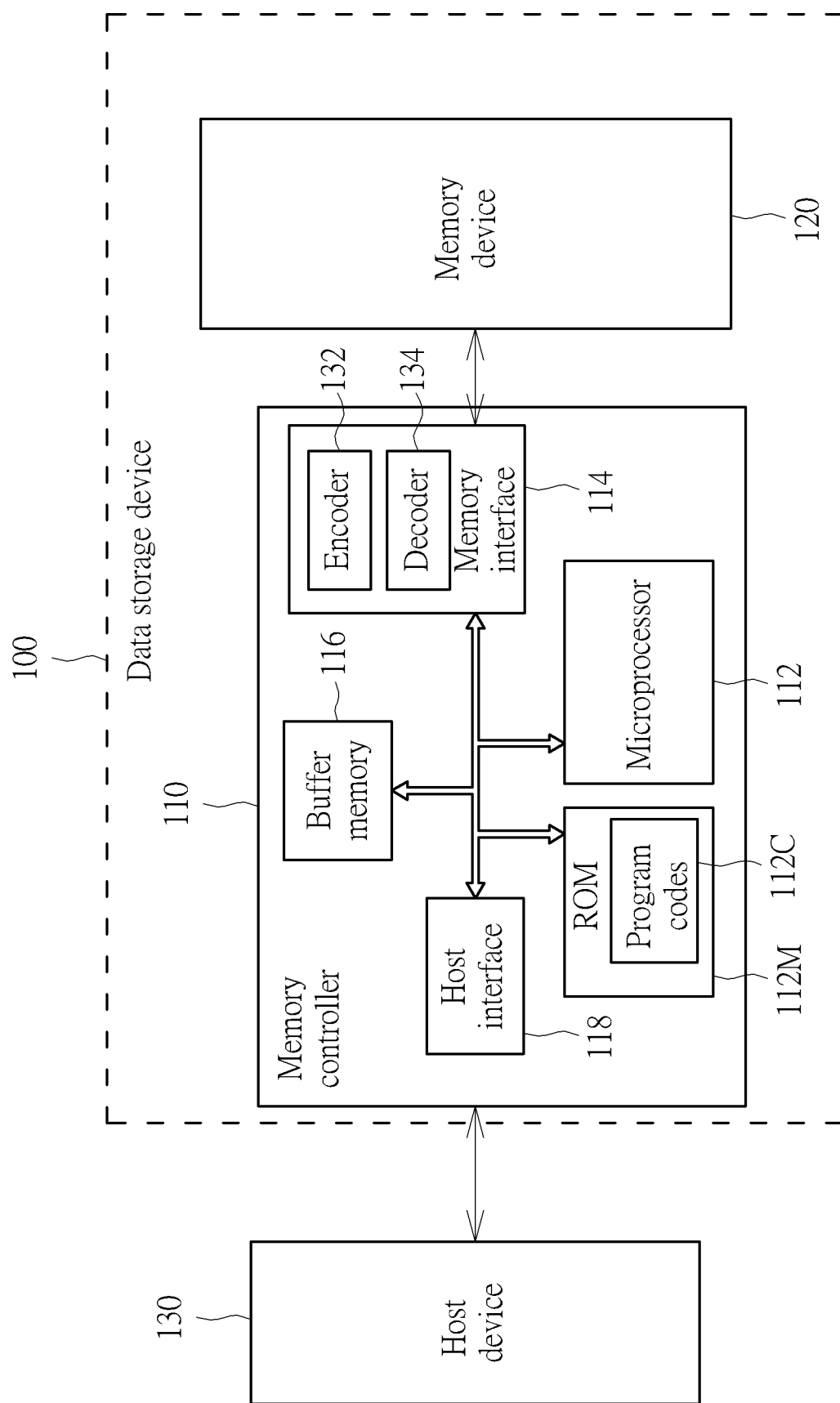
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

The memory device 120 may store a global Logical-to-Physical (L2P) (or called Host-to-Flash (H2F)) mapping table, for the memory controller 110 to access data in the memory device 120. The global L2P mapping table may be located in a predetermined region within the memory device 120, such as a system region, but the invention is not limited thereto. The global L2P mapping table may be divided into a plurality of local L2P mapping tables, and the local L2P mapping tables may be stored in the same or different memory elements. For example, one memory element may store one local L2P mapping table. When needed, the memory controller 110 may load at least one portion (e.g. a portion or all) of the global L2P mapping table into the buffer memory 116 or other memories. For example, the memory controller 110 may load a local L2P mapping table to be a temporary L2P mapping table, for the memory controller 110 to access data in the memory device 120 according to local L2P mapping table, but the invention is not limited thereto.

In order to improve the read performance, the HPB (Host Performance Booster) series standards have been recently promulgated. The HPB uses a memory at the host device side (such as the DRAM of the host device 130) to temporarily store the mapping information maintained by the UFS device (such as the data storage device 100 implemented in compliance with the UFS standards). The mapping information may be retrieved from the global or local L2P mapping table. With the aid of the mapping information, the host device 130 may issue specific read commands (hereinafter called the HPB READ commands) carrying information regarding physical addresses (such as the physical block addresses (PBAs)), which are carried in the HPB entries, corresponding to logical addresses (such as the logical block addresses (LBAs)) that the host device 130 attempts to read to read data. In this manner, as compared to the normal read command, the memory controller 110 could save the time to read and load the global or local L2P mapping table from the memory device 120 and save the time to search the physical addresses corresponding to the logical addresses that the host device 130 attempts to read in the loaded L2P mapping table. Therefore, the read performance can be improved.

Figure 2:
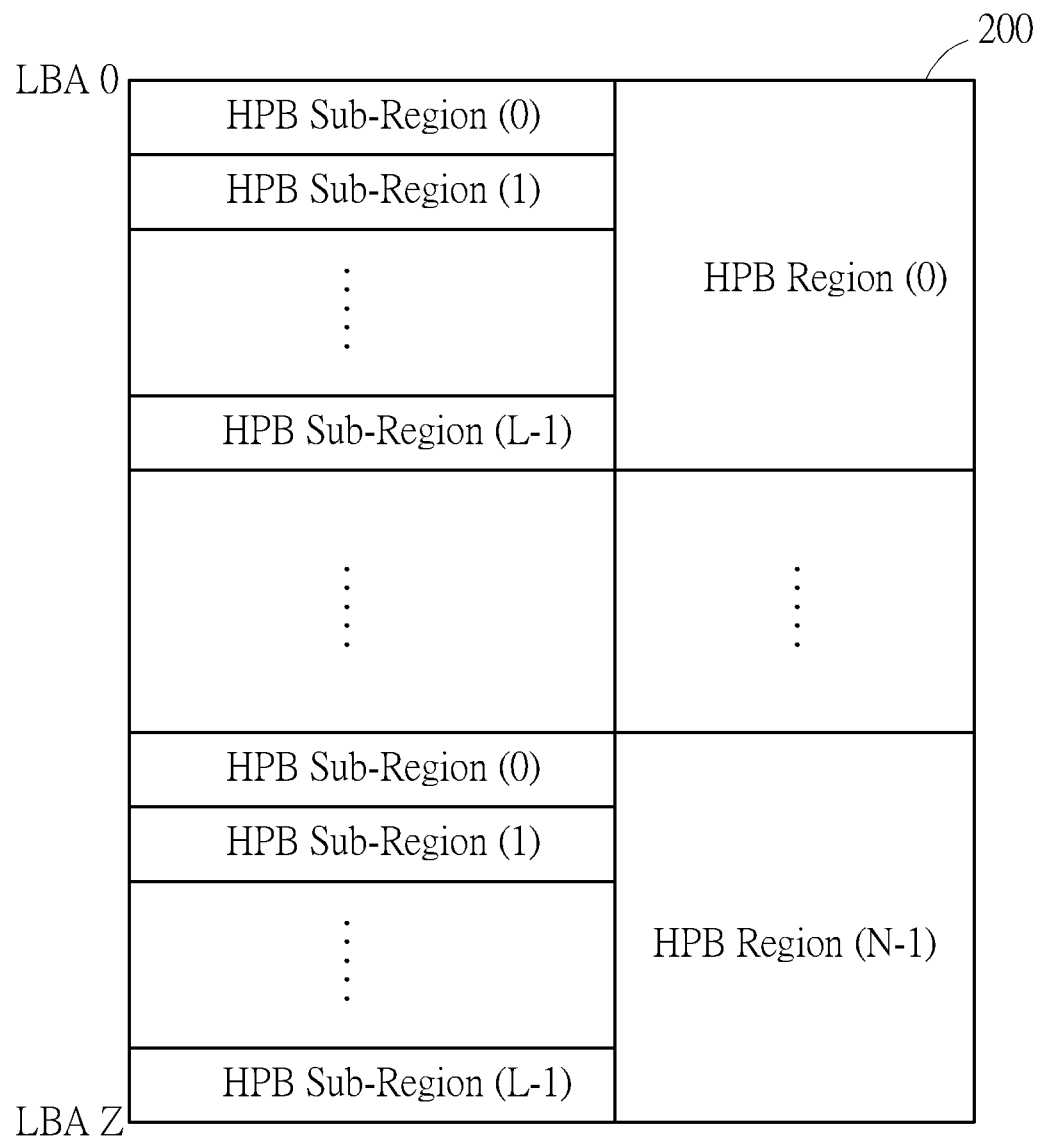
FIG. 2 is a schematic diagram showing an exemplary logical unit and its corresponding LBAs.

Generally, the memory device 120 may be divided into several partitions, each partition may be regarded as a logical unit, and each logical unit may correspond to a plurality of LBAs. FIG. 2 is a schematic diagram showing an exemplary logical unit 200 and its corresponding LBAs. As defined in the HPB specification, the LBAs (such as the LBAs LBA 0-LBA Z, where Z is a positive integer) corresponding to each logical unit may be divided into a plurality of HPB Regions (such as the HPB Region (0)-HPB Region (N−1), where N is a positive integer and greater than 1), and each HPB Region may be further divided into a plurality of HPB Sub-Regions (such as the HPB Sub-Region (0)-HPB Sub-Region (L−1), where L is a positive integer). The size of one HPB Sub-Region (hereinafter called a Sub-Region for brevity) may be smaller than or equal to the size of one HPB Region (hereinafter called a Region for brevity).

In the embodiments of the invention, there are two modes for obtaining the HPB entries, including the Host control mode and the Device control mode.

Figure 3:
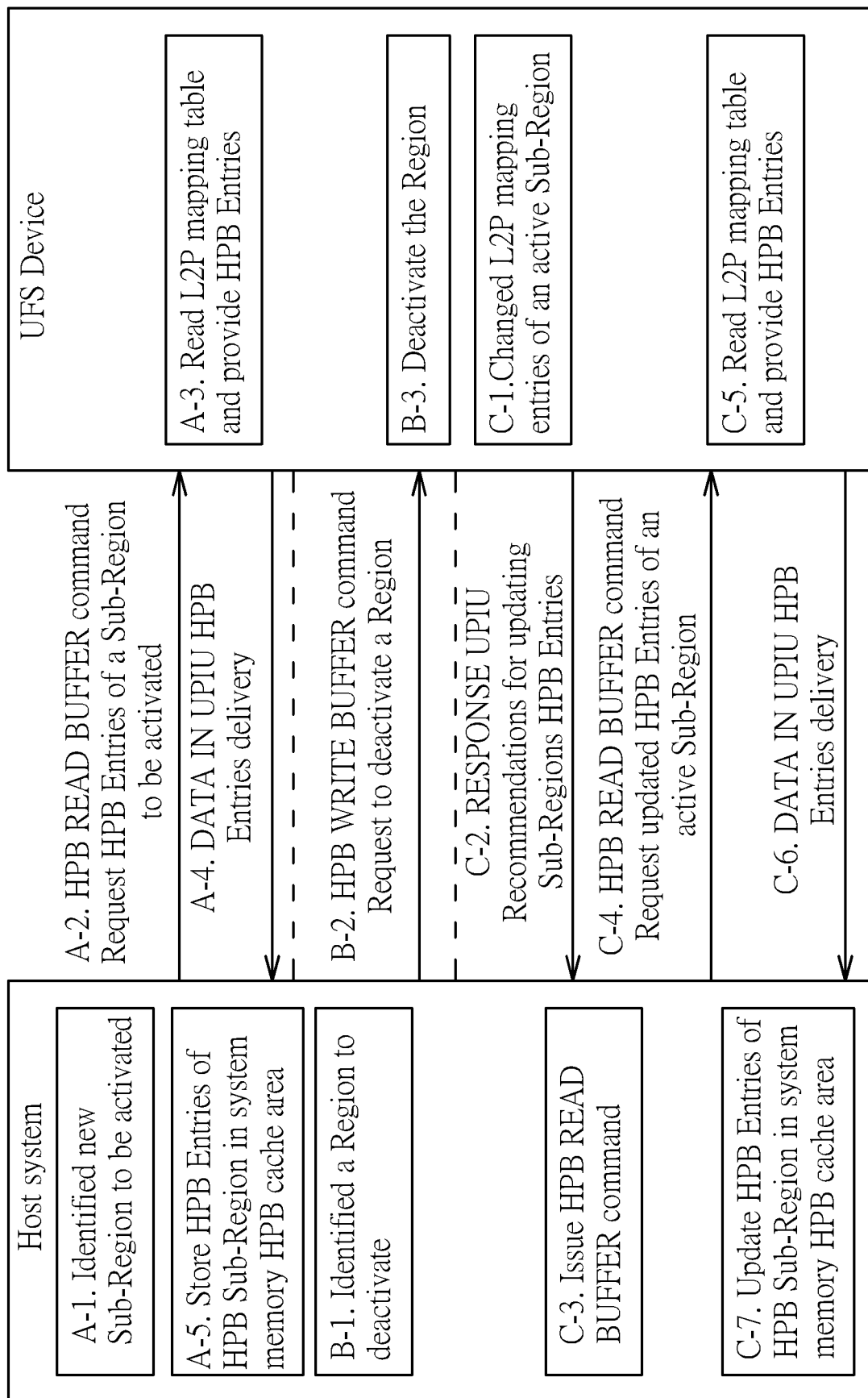
FIG. 3 is a schematic diagram showing operations under the Host control mode.

FIG. 3 is a schematic diagram showing operations under the Host control mode. In the Host control mode, the host system (such as the host device 130) may identify the new Sub-Region to be activated (e.g. the operation A-1) and issue an HPB READ BUFFER command to request the HPB entries of the Sub-Region to be activated (e.g. the operation A-2). In response to reception of the HPB READ BUFFER command, the UFS device (such as the memory controller 110) may read at least a portion of the L2P mapping table (such as the global L2P mapping table or the local L2P mapping table) corresponding to the designated Sub-Region to be activated from the memory device 120 and provide the HPB entries based on the mapping information recorded in the L2P mapping table (e.g. the operation A-3). The UFS device may then deliver the HPB entries via a DATA IN UFS Protocol Information Unit (UPIU) packet to the host system (e.g. the operation A-4). The host system may allocate an HPB area (also referred to as an HPB cache area) in a system memory for storing the HPB entries (e.g. the operation A-5).

The host system may also identify the Region to deactivate (e.g. the operation B-1) and issue an HPB WRITE BUFFER command to request to deactivate a Region (e.g. the operation B-2). In response to reception of the HPB WRITE BUFFER command, the UFS device may deactivate the Region (e.g. the operation B-3).

In addition, when the UFS device determines that update of the HPB entries of any Sub-Region is required, for example, when the UFS device has changed the L2P mapping information (e.g. L2P mapping entries) of an active Sub-Region (e.g. the operation C-1), the UFS device may transmit a RESPONSE UPIU packet to the host system for recommendation for updating Sub-Regions HPB entries (e.g. the operation C-2). The host system may issue an HPB READ BUFFER command in response to reception of the RESPONSE UPIU packet (e.g. the operation C-3) and transmit the HPB READ BUFFER command to the UFS device to request updated HPB entries of an active Sub-Region (e.g. the operation C-4). In response to reception of the HPB READ BUFFER command, the UFS device may read the portion of the L2P mapping table associated with the active Sub-Region and provide the HPB entries based on the mapping information recorded in the L2P mapping table (e.g. the operation C-5). Similarly, the UFS device may deliver the HPB entries via a DATA IN UPIU packet to the host system (e.g. the operation C-6). The host system may update the HPB entries of the HPB Sub-Region stored in the system memory HPB cache area based on the received information (e.g. the operation C-7).

Figure 4:
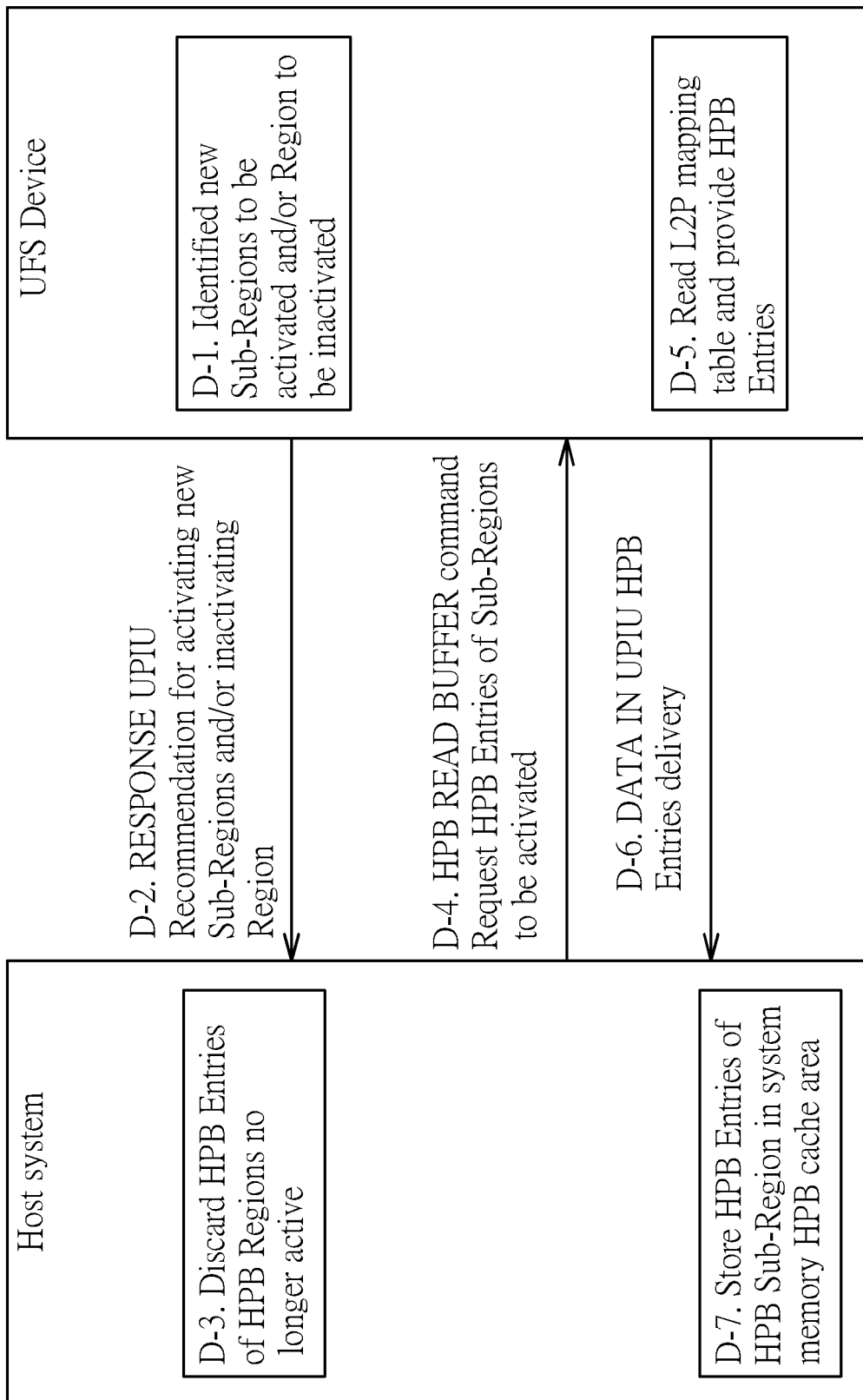
FIG. 4 is a schematic diagram showing operations under the Device control mode.

FIG. 4 is a schematic diagram showing operations under the Device control mode. In the Device control mode, the UFS device may identify the new Sub-Regions to be activated and/or a Region to be inactivated (e.g. the operation D-1) and transmit a RESPONSE UPIU packet to the host system for recommendation for activating the new Sub-Regions and/or inactivating the Region (e.g. the operation D-2). Regarding inactivating the Region, in response to reception of the RESPONSE UPIU packet, the host system may discard the HPB entries of the HPB Regions no longer active (e.g. the operation D-3). Regarding activating the new Sub-Regions, the host system may issue an HPB READ BUFFER command to the UFS device to request the HPB entries of the new Sub-Regions to be activated (e.g. the operation D-4). Similarly, in response to reception of the HPB READ BUFFER command, the UFS device may read at least a portion of the L2P mapping table (such as read the global L2P mapping table or the local L2P mapping table) corresponding to the designated Sub-Region to be activated from the memory device 120 and provide the HPB entries based on the mapping information recorded in the L2P mapping table (e.g. the operation D-5). The UFS device may then deliver the HPB entries via a DATA IN UPIU packet to the host system (e.g. the operation D-6). The host system may allocate an HPB area (also referred to as an HPB cache area) in a system memory for storing the HPB entries (e.g. the operation D-7).

FIG. 5 is a schematic diagram showing an exemplary format for an HPB entry. In an exemplary embodiment, the size of one HPB entry is 8 Bytes. In this exemplary format, four bytes may be utilized to carry the mapping information (for example, the physical address) obtained from the L2P mapping table (such as the global or local L2P mapping table, or a temporary L2P mapping table loaded by the memory controller 110 in the buffer memory 116), and the other four bytes may be utilized to carry another physical address indicating where the aforementioned global or local L2P mapping table is physically stored in the flash memory. To be more specific, in the exemplary format shown in FIG. 5, the first 4 bytes PBA and the second 4 bytes PBA are combined to form an HPB entry. The first PBA is a PBA recorded in the Table 1 (also referred to as the T1 table), and this PBA is mapped by an LBA. The second PBA is a PBA recorded in the Table 2 (also referred to as the T2 table), and this PBA is the PBA of the T1 table. Here, the T1 table may be the global or local L2P mapping table stored in the memory device 120, and the T2 table may be a system table recording the corresponding addresses at which the management tables (for example, the global or local L2P mapping tables) are physically stored in the memory device 120.

Because the memory controller 110 may allocate another memory space to store a management table (such as the global or local L2P mapping table) when the content (such as the mapping information) of this management table has to be updated, when the PBA mapped by an LBA is changed, not only the content of the T1 table is modified but also the updated T1 table is stored in a new space of the memory device 120. Therefore, the corresponding physical address of the T1 table recorded in the system table may change as well. In this manner, the content of the T2 table carried in an HPB entry (e.g. the "Content from Table 2" as shown in FIG. 5) may be utilized to verify if the data stored in a PBA mapped by an LBA corresponding to (or, associated with) this HPB entry is still valid. When the content of the T2 table carried in the HPB entry is the same as the corresponding physical address of the latest T1 table maintained by the memory controller 110, the data stored in this PBA, that is, the content of the T1 table carried in the HPB entry, (e.g. the "Content from Table 1" as shown in FIG. 5) is regarded as valid. Otherwise, the data stored in this PBA carried in the HPB entry is regarded as invalid. Noted that verification of whether the data of a PBA is still valid may be performed by the memory controller 110 at the data storage device side.

Figure 6:
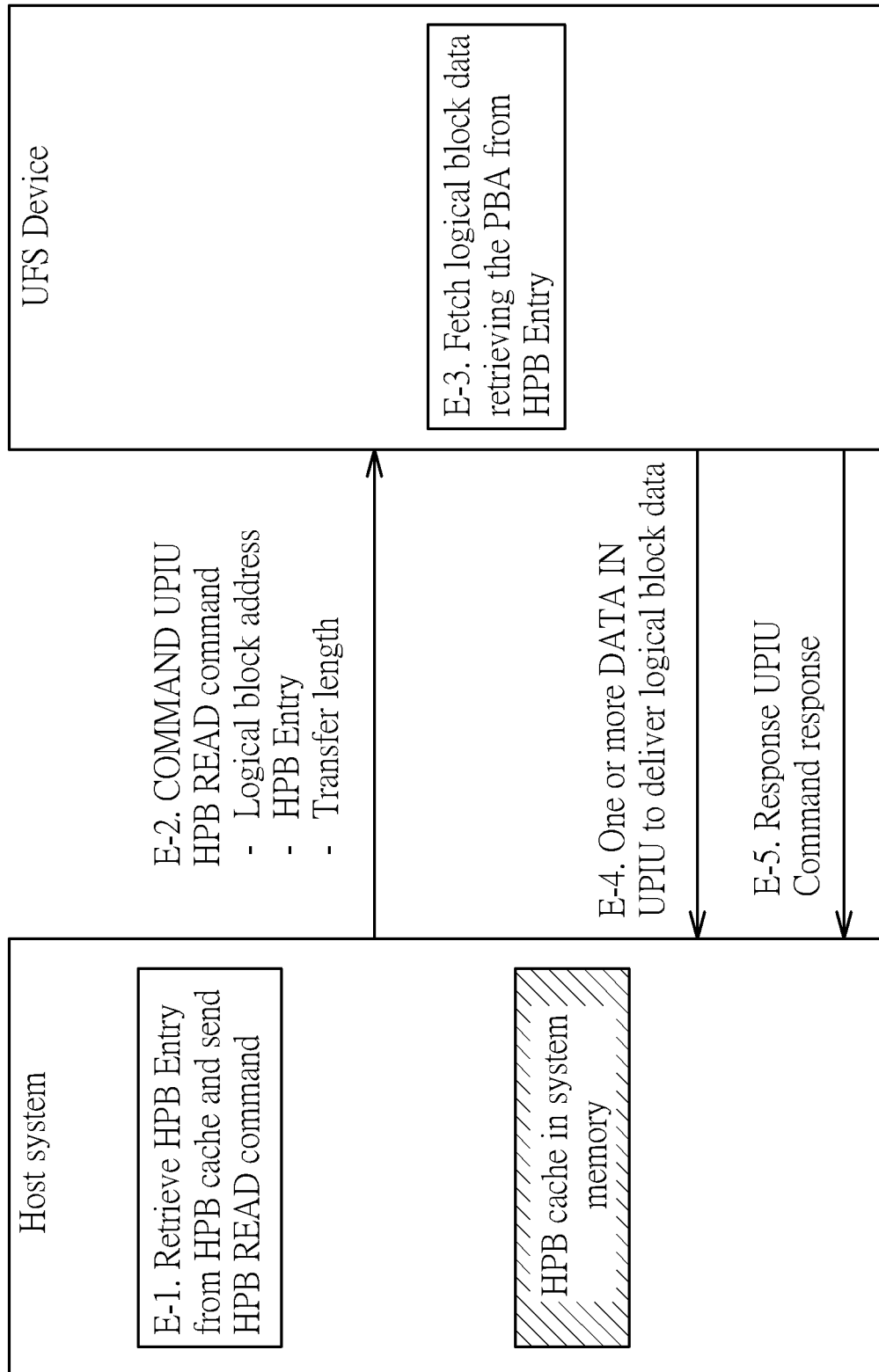
FIG. 6 is a schematic diagram showing operations corresponding to the HPB READ command.

With the aid of the HPB entries, the host device 130 may issue the HPB READ commands carrying information regarding a starting logical address that the host device 130 attempts to read, a transfer length and the HPB entry to read data. FIG. 6 is a schematic diagram showing operations corresponding to the HPB READ command. The host system may retrieve HPB entry from the HPB cache and send an HPB READ command (e.g. the operation E-1) carrying an LBA (such as the starting LBA), the HPB entry corresponding to this LBA and a TRANSFER LENGTH via an HPB READ command UPIU packet to the UFS device (e.g. the operation E-2). In a specific embodiment, the TRANSFER LENGTH is limited to 1, but the invention should not be limited thereto. In other embodiments of the invention, the TRANSFER LENGTH may be any positive integer. Upon receiving the HPB READ command, the UFS device may decode the received HPB entry corresponding to the designated LBA that the host system attempts to read to obtain information regarding the physical address or the PBA of the designated LBA and access the memory device according to the physical address or the PBA to obtain or fetch the data that the host system attempts to read (e.g. the operation E-3). The UFS device may determine whether the received HPB entry is stall valid in the operation E-3. For example, the UFS device may determine whether the received HPB entry is stall valid by determining whether the content of the T2 table carried in the HPB entry is the same as the corresponding physical address of the latest T1 table maintained by the memory controller 110. When the received HPB entry is determined stall valid, the USF device may obtain the data that the host device 130 attempts to read (e.g. the "logical block data" shown in FIG. 6) and transmit one or more DATA IN UPIU packets to the host system to deliver the data to the host system (e.g. the operation E-4) and transmit a RESPINSE UPIU Command to the host system (e.g. the operation E-5) after the data delivery, where the "logical block data" refers to the data corresponding to the LBA that the host device 130 attempts to read. On the other hand, when the received HPB entry is determined invalid, the UFS device may skip the operation E-4 and directly perform the operation E-5 to recommend for updating the corresponding the HPB entries by transmitting a RESPINSE UPIU Command packet to the host system.

It should be noted that in some embodiments of the invention, the UFS device may actively recommend the host system to update the HPB entry, for example, as in the operation C-2, the UFS device may transmit a RESPONSE UPIU packet to the host system for recommendation for updating Sub-Regions HPB entries, or as in the operation D-2, the UFS device may transmit a RESPONSE UPIU packet to the host system for recommendation for activating the new Sub-Regions. In other embodiments of the invention, the UFS device may also not actively recommend the host system to update the HPB entry. In such embodiments, the UFS device may transmit a RESPONSE UPIU packet to the host system for recommending the host system to update the HPB entry after determining that the corresponding HPB entry is invalid. For example, upon receiving the HPB READ command, the UFS device may recommend the host system to update the HPB entry by transmitting a RESPONSE UPIU packet to the host system when determining that the received HPB entry is invalid in the aforementioned operation E-3.

According to an embodiment of the invention, the memory controller 110 may configure a predetermined memory block as an active memory block (or called a buffer) to receive data from the host device 130, and accordingly record a plurality of logical addresses in a mapping table. The mapping table may be a Physical-to-Logical (P2L) (or called Flash-to-Host (F2H)) mapping table. Different from the global or local L2P mapping table stored in the memory device 120, the P2L mapping table corresponding to the active memory block may be stored in the buffer memory 116 as a temporary mapping table.

In an embodiment of the invention, the P2L mapping table may comprises a plurality of fields, one field of the P2L mapping table corresponds to one physical address of the active memory block and is configured to record mapping information of this physical address, where four physical addresses may correspond to one physical page. For example, one physical address may be used to store 4 Kilobyte (KB) of data, and the size of one physical page may be 16 KB. The mapping information of a physical address recorded in the P2L mapping table of the active memory block is the physical-to-logical mapping information regarding which logical address the data stored in the corresponding physical address of the active memory block is directed to.

In addition, the global or local L2P mapping table (hereinafter collectively called the L2P mapping table) stored in the memory device 120 may comprises a plurality of fields, one field of the L2P mapping table is configured to record mapping information of one logical address, where one logical address may correspond to one logical page. The mapping information of a logical address or a logical page recorded in the L2P mapping table is the logical-to-physical mapping information regarding which physical address of the memory device stores data of the corresponding logical address or logical page.

Generally, content of the P2L mapping table corresponding to the active memory block will be updated to the L2P mapping table stored in the memory device 120 only when the active memory block is full and is to be updated as a data block in the data region within the memory device 120. That is, in the conventional design, the content of the P2L mapping table corresponding to the active memory block will not be updated to the L2P mapping table when the active memory block is still active and is still utilized for receiving data from the host device 130. Therefore, upon receiving a read command with a designated logical address that the host device 130 attempts to read, the memory controller 110 still has to lookup the P2L mapping table corresponding to the active memory block first based on the designated logical address to determine whether the active memory block stores data of the designated logical address. If so, the memory controller 110 provides the data of the designated logical address stored in the active memory block to the host device 130 since the active memory block stores the latest data. If not, the memory controller 110 may have to further load the L2P mapping table (for example, when HPB is not applied) and look up the L2P mapping table to retrieve the physical address that stores data of the designated logical address to be read.

However, as discussed above, table lookup or search in the table is a time consuming operation. In order to solve this problem and to further improve the read speed of the memory device, especially when HPB is applied, in the embodiments of the invention, the memory controller 110 is configured to establish a sub-region bit table to record or indicate data of which sub-region is stored in the active memory block, and update content of the sub-region bit table in response to write operations of the active memory block.

To be more specific, according to an embodiment of the invention, the sub-region bit table may comprise one or more bits, each bit may be associated with one or more sub-regions and a value of each bit may be initially set to a default value. It should be noted that although the sub-region bit table which records or indicates data of which sub-region is stored in the active memory block is illustrated above, the invention should not be limited thereto. In other embodiments of the invention, the aforementioned bit table may also be a region bit table which records or indicates data of which region is stored in the active memory block. In addition, in the embodiments of the invention, the aforementioned region may be the HPB Region as shown in FIG. 2, and the aforementioned sub-region may be the HPB Sub-Region as shown in FIG. 2. As discussed above, the memory device 120 may be divided into several partitions, and each partition may be regarded as a logical unit corresponding to a plurality of LBAs. Each logical unit may be divided into a plurality of HPB Regions and each HPB Region further divided into a plurality of HPB Sub-Regions. In the following paragraphs, the sub-region bit table and the region bit table are collectively called the Region/Sub-Region bit table for brevity.

In one embodiment of the invention, the Region/Sub-Region bit table may comprise a plurality of bits and each bit may be associated with one HPB Region/HPB Sub-Region. Therefore, the value of each bit indicates whether data of the associated HPB Region/HPB Sub-Region is stored in the active memory block. In another embodiment of the invention, the Region/Sub-Region bit table may comprise a plurality of bits and each bit is associated with more than one HPB Region/HPB Sub-Region. That is, information regarding whether data of the associated HPB Regions/HPB Sub-Regions is stored in the active memory block is compressed in one bit. Therefore, the value of each bit indicates whether data of any of the associated HPB Regions/HPB Sub-Regions is stored in the active memory block. In yet another embodiment of the invention, the Region/Sub-Region bit table may comprise only one bit which may be associated with one or more HPB Regions/HPB Sub-Regions. Therefore, the value of this bit indicates whether data of any of the associated one or more HPB Regions/HPB Sub-Regions is stored in the active memory block.

In some embodiments of the invention, the one or more HPB Regions/HPB Sub-Regions associated with the bit(s) of the Region/Sub-Region bit table may be the one or more HPB Regions/HPB Sub-Regions requested to be activated by the host device 130 (or, the one or more activated HPB Regions/HPB Sub-Regions). In other embodiments of the invention, the one or more HPB Regions/HPB Sub-Regions associated with the bit(s) of the Region/Sub-Region bit table may be not limited to the one or more HPB Regions/HPB Sub-Regions requested to be activated by the host device 130 (or, the one or more activated HPB Regions/HPB Sub-Regions).

As discussed above, the host system (such as the host device 130) may identify the new Sub-Region to be activated and issue an HPB READ BUFFER command to request the HPB entries of the Sub-Region to be activated. Therefore, upon receiving the HPB READ BUFFER command, the memory controller 110 may know which HPB Sub-Region(s) is/are to be activated. When the Region/Sub-Region bit table may comprise more than one bit and each bit is associated with one or more activated HPB Regions/HPB Sub-Regions, the memory controller 110 may add one or more bits that is/are associated with the new HPB Sub-Region(s) to be activated in the Region/Sub-Region bit table. That is, according to an embodiment of the invention, in the case when the Region/Sub-Region bit table comprises more than one bit and the one or more HPB Regions/HPB Sub-Regions associated with the bit(s) of the Region/Sub-Region bit table are the one or more activated HPB Regions/HPB Sub-Regions, the Region/Sub-Region bit table may be extendable. When there is any new HPB Sub-Region(s) requested to be activated by the host device 130, the memory controller 110 may add one or more bits that is/are associated with the HPB Sub-Region(s) to be activated in the Region/Sub-Region bit table. On the contrary, when there is any HPB Region(s) requested to be deactivated by the host device 130, the memory controller 110 may delete one or more bits that is/are associated with the HPB Sub-Region(s) belonging to the HPB Region(s) to be deactivated in the Region/Sub-Region bit table. Note that in this case, the memory controller 110 may further record which bit is associated with which activated HPB Region(s)/HPB Sub-Region(s).

According to another embodiment of the invention, in the case when there is only one bit comprised in the Region/Sub-Region bit table, the only one bit may be associated with the activated HPB Regions/HPB Sub-Region(s) and/or the HPB Regions/HPB Sub-Region(s) to be activated. In addition, the only one bit may be utilized as a flag to indicate whether the active memory block stores data of any logical address belonging to the activated HPB Regions/HPB Sub-Region(s) and/or the HPB Regions/HPB Sub-Region(s) to be activated. If the active memory block stores data of any logical address belonging to the activated HPB Regions/HPB Sub-Region(s) and/or the HPB Regions/HPB Sub-Region(s) to be activated, the memory controller 110 sets the value of the flag to a predetermined value different from the default value. Otherwise, the value of the flag is kept as the default value.

According to an embodiment of the invention, the Region/Sub-Region bit table may be stored in the buffer memory 116 and maintained by the memory controller 110 according to the data stored in the active memory block. In the embodiments of the invention, with the information recorded in the Region/Sub-Region bit table, upon receiving a read command or an HPB read command, the memory controller 110 may determine whether the operation of looking up the P2L mapping table corresponding to the active memory block can be skipped. For example, when the flag or a bit of the Region/Sub-Region bit table indicates that data of the logical address to be read is not stored in the active memory block, the memory controller 110 may determines that the operation of looking up the P2L mapping table corresponding to the active memory block can be skipped. In this manner, the time required for a useless search in the P2L mapping table corresponding to the active memory block can be saved (since the data of the logical address to be read is not stored in the active memory block), and the read speed of the memory device can be improved. Especially, when the read command received by the memory controller 110 is an HPB read command, the memory controller 110 may directly use the physical address or the PBA obtained by decoding the received HPB entry corresponding to the designate LBA to be read to access the memory device 120 when determining that the operation of looking up the P2L mapping table corresponding to the active memory block can be skipped. In this manner, the boosting effect of using the HPB entry can be really brought out.

Figure 7:
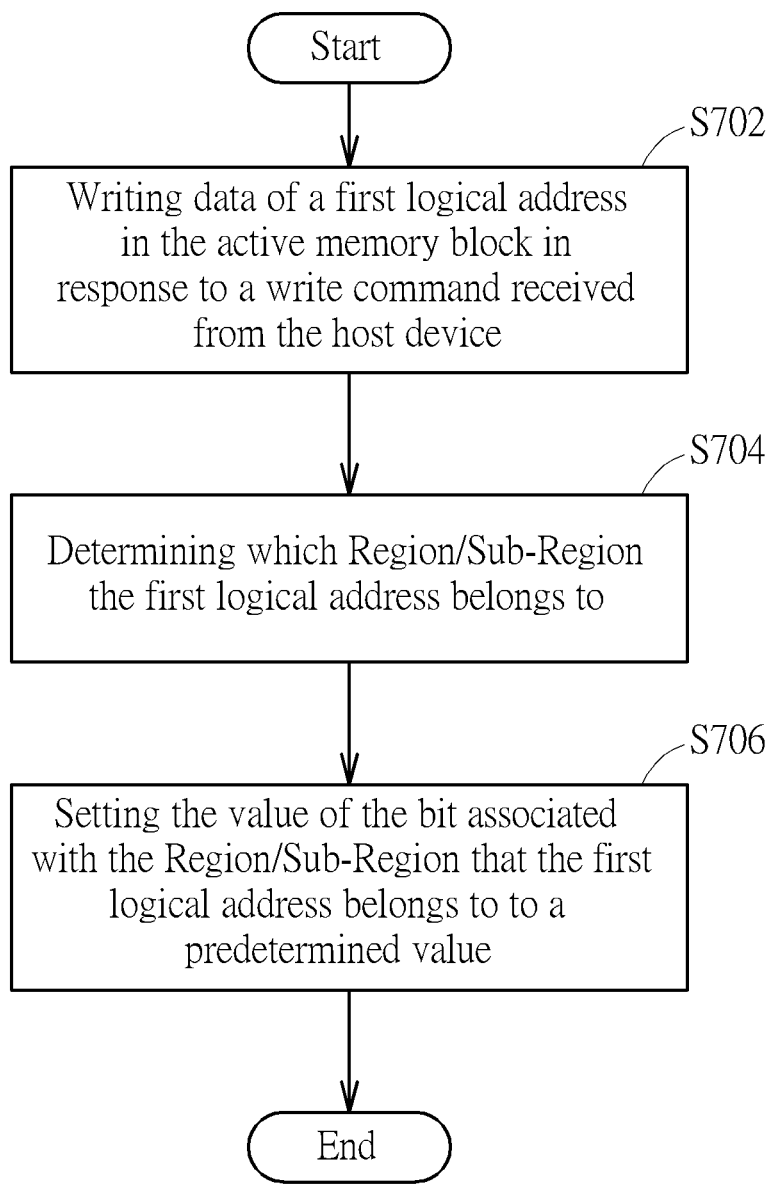
FIG. 7 is a flow chart of a data processing method for improving read speed of a memory device according to an embodiment of the invention.

FIG. 7 is a flow chart of a data processing method capable of improving read speed of a memory device according to an embodiment of the invention. In FIG. 7, operations of updating content of the Region/Sub-Region bit table are illustrated. The method may be performed by the memory controller 110 and may comprise the following steps:

Step S702: Writing data of a first logical address in the active memory block in response to a write command received from the host device 130 to write the data of the first logical address in the memory device 120.

Step S704: Determining which Region/Sub-Region the first logical address belongs to. Exemplary relationships between the logical addresses (e.g. the LBAs) and the HPB Region/HPB Sub-Region are shown in FIG. 2. The person of ordinary skill in the art will be able to derive the method of converting the logical address into the index of the HPB Region/HPB Sub-Region, and the descriptions are omitted here for brevity.

Step S706: Setting the value of the bit associated with the Region/Sub-Region that the first logical address belongs to to a predetermined value different from the default value. Note that in some embodiments of the invention, when the one or more HPB Regions/HPB Sub-Regions associated with the bit(s) in the Region/Sub-Region bit table are the activated HPB Regions/HPB Sub-Regions, Step S706 may be skipped when the Region/Sub-Region determined in step S704 is not one of the activated HPB Regions/HPB Sub-Regions.

Figure 8:
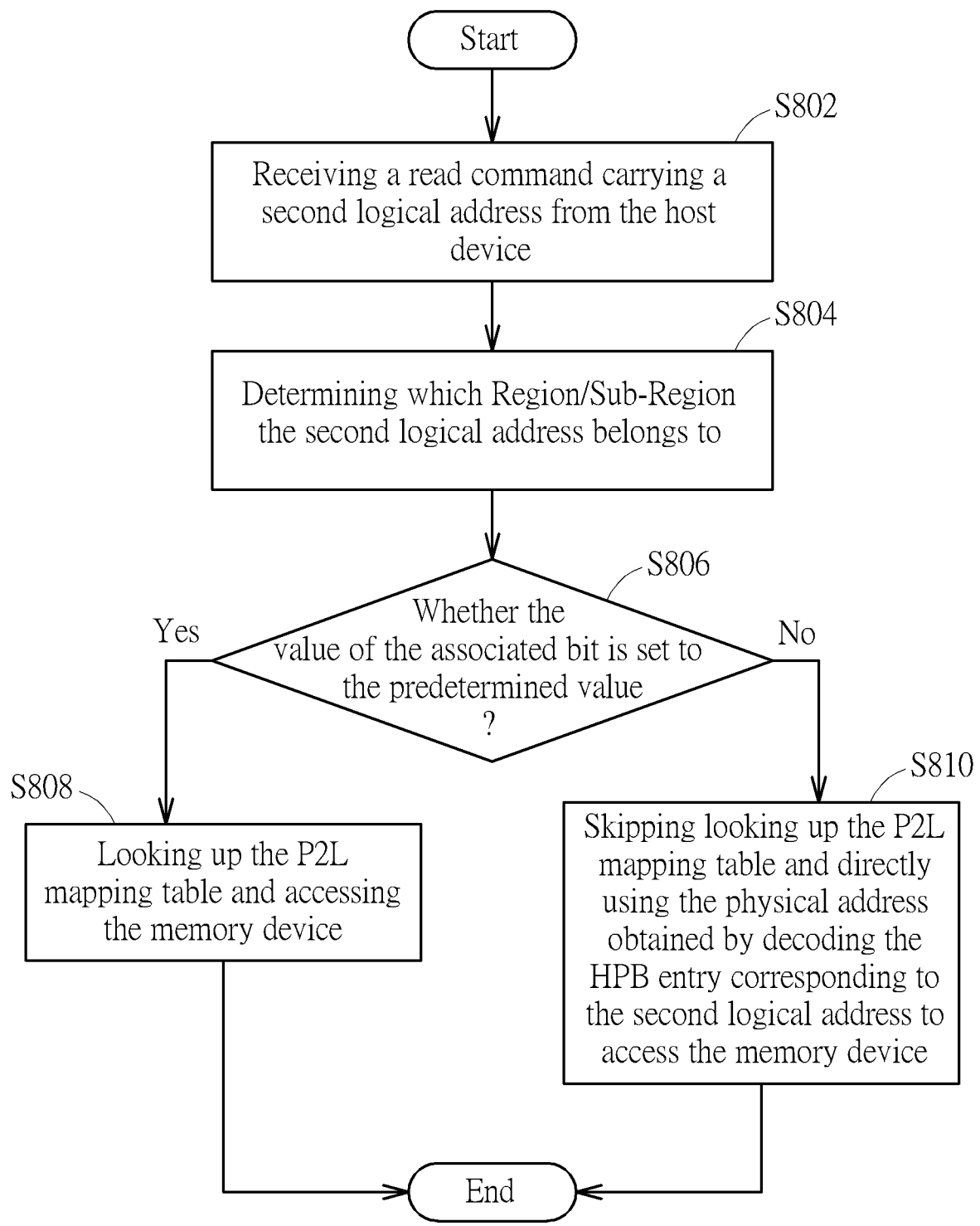
FIG. 8 is a flow chart of a data processing method capable of improving read speed of a memory device according to another embodiment of the invention.

FIG. 8 is a flow chart of a data processing method capable of improving read speed of a memory device according to another embodiment of the invention. In FIG. 8, operations of using content of the Region/Sub-Region bit table are illustrated. The method may be performed by the memory controller 110 and may comprise the following steps:

Step S802: Receiving a read command carrying a second logical address from the host device 130. In an embodiments of the invention, the read command may be an HPB READ command carrying the second logical address (such as the starting LBA), the HPB entry corresponding to the second logical address and a TRANSFER LENGTH.

Step S804: Determining which Region/Sub-Region the second logical address belongs to.

Step S806: Determining whether the value of the bit in the sub-region bit table associated with the Region/Sub-Region that the second logical address belongs to is set to the predetermined value. If yes, step S808 is performed. If no, step S810 is performed.

Step S808: Looking up the P2L mapping table corresponding to the active memory block to determine whether there is a physical address of the active memory block that stores data of the second logical address and then access the memory device 120. The memory controller 110 may look up the P2L mapping table corresponding to the active memory block according to the second logical address to determine whether the active memory block stores data of the second logical address, and may then access the memory device 120 to obtain the data that the host system attempts to read according to the determination result. If the active memory block stores data of the second logical address, the memory controller 110 provides the data of the second logical address stored in the active memory block to the host device 130 since the active memory block stores the latest data. If not, the memory controller 110 then uses the physical address or the PBA of the second logical address obtained by decoding the received HPB entry corresponding to the second logical address to access the memory device 120, obtains the data that the host system attempts to read and provides the data of the second logical address to the host device 130.

Step S810: Skipping the operation of looking up the P2L mapping table corresponding to the active memory block (that is, not looking up the P2L mapping table) and directly using the physical address or the PBA of the second logical address obtained by decoding the received HPB entry corresponding to the second logical address to access the memory device 120, obtain the data that the host system attempts to read and provide the data of the second logical address to the host device 130.

According to an embodiment of the invention, the memory controller 110 may be configured to establish the Region/Sub-Region bit table and update content of the Region/Sub-Region bit table in response to the write operation of the active memory block after the memory controller 110 has delivered one or more HPB entries to the host device 130. Since the physical address that stores data of a predetermined logical address may be changed when the memory controller 110 perform some background operation (such as the garbage collection) or when the host device 130 updates the data of the predetermined logical address after the memory controller 110 has delivered one or more HPB entries in response to the HPB READ BUFFER command issued by the host device 130, the physical addresses encoded in the HPB entries may become incorrect or out-of-date. Therefore, in the embodiments of the invention, the memory controller 110 may start to use the Region/Sub-Region bit table to record or indicate data of which sub-region is stored in the active memory block and update content of the Region/Sub-Region bit table in response to write operations of the active memory block after the memory controller 110 has delivered one or more HPB entries to the host device 130.

According to another embodiment of the invention, in response to a determination of recommending for activating one or more sub-regions of the memory device (for example, when the HPB is applied under the Device control mode) or delivering one or more HPB entries (for example, when the HPB is applied under the Host control mode) is required, before delivering the HPB entries to the host device 130, the memory controller 110 may directly update the L2P mapping table based on the P2L mapping table having the latest mapping information corresponding to the active memory block. After the L2P mapping table has been updated based on the P2L mapping table corresponding to the active memory block, the memory controller 110 may establish the Region/Sub-Region bit table and update content of the Region/Sub-Region bit table in response to the write operation of the active memory block. That is, the memory controller 110 may start to use the Region/Sub-Region bit table to record or indicate data of which sub-region is stored in the active memory block and update content of the Region/Sub-Region bit table in response to write operations of the active memory block after content of the L2P mapping table has been updated based on the P2L mapping table corresponding to the active memory block. In addition, after the L2P mapping table has been updated based on the P2L mapping table corresponding to the active memory block, the memory controller 110 may generate the HPB entries based on the L2P mapping table having the latest mapping information and deliver a packet (such as the DATA IN UPIU packet) comprising the HPB entries to the host device 130. In this manner, the problem of incorrect or out-of-date physical address in the HPB entries (for example, the physical addresses that have been encoded in the HPB entries become incorrect or out-of-date due to the access operation of the memory device, or the physical addresses being encoded in the HPB entries are incorrect physical addresses or already out-of-date) can be solved.

According to yet another embodiment of the invention, the memory controller 110 may establish the Region/Sub-Region bit table and update content of the Region/Sub-Region bit table in response to the write operation of the active memory block after the active memory block is configured.

In the embodiments of the invention, by using the Region/Sub-Region bit table to record or indicate data of which sub-region is stored in the active memory block, the memory controller 110 may skip the operation of lookup the P2L mapping table corresponding to the active memory block based on the designate logical address that the host device 130 attempts to read as the conventional design, and may directly use the physical address or the PBA obtained by decoding the received HPB entry corresponding to the designate logical address to access the memory device 120 when determining that the operation of looking up the P2L mapping table corresponding to the active memory block can be skipped based on the content recorded in the Region/Sub-Region bit table. In this manner, the boosting effect of using the HPB entry can be really brought out, and access performance of the memory device can be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
a memory device, comprising a plurality of memory blocks; and
a memory controller, coupled to the memory device and configured to access the memory device,
wherein the memory controller is configured to configure a predetermined memory block as an active memory block to receive data from a host device, store a first mapping table corresponding to the active memory block, and update content of a sub-region bit table in response to a write operation of the active memory block, wherein the sub-region bit table comprises one or more bits, each bit is associated with one or more sub-regions and a value of each bit is initially set to a default value, and the first mapping table comprises a plurality of fields, one field of the first mapping table is configured to record mapping information of one physical address of the active memory block, and the mapping information of the physical address is physical-to-logical mapping information regarding which logical address the data stored in the physical address of the active memory block is directed to, and
wherein when data of a first logical address received from the host device is written in the active memory block, the memory controller is configured to determine which sub-region the first logical address belongs to and set the value of the bit associated with the sub-region that the first logical address belongs to to a predetermined value different from the default value, and
wherein the memory device is configured to store a second mapping table, the second mapping table comprises a plurality of fields, one field of the second mapping table is configured to record mapping information of one logical address, and the mapping information of the logical address is logical-to-physical mapping information regarding which physical address of the memory device stores data of the logical address, and the memory controller is configured to establish the sub-region bit table and update content of the sub-region bit table in response to the write operation of the active memory block after content of the second mapping table has been updated based on the first mapping table.

2. The data storage device as claimed in claim 1, wherein in response to reception of a read command carrying a second logical address, the memory controller is configured to determine which sub-region the second logical address belongs to and determine whether the value of the bit associated with the sub-region that the second logical address belongs to in the sub-region bit table is set to the predetermined value, and when the value of the bit associated with the sub-region that the second logical address belongs to is not set to the predetermined value, the memory controller is configured to skip looking up the first mapping table according to the second logical address.

3. The data storage device as claimed in claim 2, wherein when the value of the bit associated with the sub-region that the second logical address belongs to is set to the predetermined value, the memory controller is configured to lookup the first mapping table according to the second logical address to determine whether there is a physical address of the active memory block that stores data of the second logical address.

4. The data storage device as claimed in claim 2, wherein the read command is a Host Performance Booster (HPB) read command carrying information regarding the second logical address and an HPB entry corresponding to the second logical address, and the HPB entry comprising information regarding a physical address that stores data of the second logical address.

5. The data storage device as claimed in claim 1, wherein the memory controller is configured to establish the sub-region bit table and update content of the sub-region bit table in response to the write operation of the active memory block after the memory controller has delivered one or more HPB entries to the host device.

6. The data storage device as claimed in claim 1, wherein the memory controller is further configured to generate one or more HPB entries based on the second mapping table after the second mapping table has been updated based on the first mapping table and deliver a packet comprising the one or more HPB entries to the host device.

7. The data storage device as claimed in claim 1, wherein the one or more sub-regions associated with each bit in the sub-region bit table are one or more sub-regions requested to be activated by the host device.

8. A data processing method for a data storage device, wherein the data storage device comprises a memory device and a memory controller, the memory device comprises a plurality of memory blocks which comprising at least an active memory block configured to receive data to be written in the memory device from a host device, the memory controller is coupled to the memory device and configured to access the memory device and store a first mapping table corresponding to the active memory block, and the data processing method is performed by the memory controller and comprises:

writing data of a first logical address in the active memory block; and updating content of a sub-region bit table in response to the write operation of the active memory block, wherein the sub-region bit table comprises one or more bits, each bit is associated with one or more sub-regions and a value of each bit is initially set to a default value, and wherein the step of updating the content of the sub-region bit table in response to the write operation of the active memory block further comprises:

determining which sub-region the first logical address belongs to; and setting the value of the bit associated with the sub-region that the first logical address belongs to to a predetermined value different from the default value, and wherein the sub-region bit table is established after content of a second mapping table has been updated based on the first mapping table, wherein the first mapping table comprises a plurality of fields, one field of the first mapping table is configured to record mapping information of one physical address of the active memory block, and the mapping information of the physical address is physical-to-logical mapping information regarding which logical address the data stored in the physical address of the active memory block is directed to, and wherein the second mapping table comprises a plurality of fields, one field of the second mapping table is configured to record mapping information of one logical address, and the mapping information of the logical address is logical-to-physical mapping information regarding which physical address of the memory device stores data of the logical address.

9. The data processing method as claimed in claim 8, further comprising:

determining which sub-region a second logical address belongs to in response to reception of a read command carrying the second logical address; and determining whether the value of the bit associated with the sub-region that the second logical address belongs to in the sub-region bit table is set to the predetermined value and accordingly determining whether to skip looking up a first mapping table according to the second logical address, wherein when the value of the bit associated with the sub-region that the second logical address belongs to is not set to the predetermined value, looking up of the first mapping table according to the second logical address is determined to be skipped.

10. The data processing method as claimed in claim 9, further comprising:

looking up the first mapping table according to the second logical address to determine whether there is a physical address of the active memory block that stores data of the second logical address when the value of the bit associated with the sub-region that the second logical address belongs to is set to the predetermined value.

11. The data processing method as claimed in claim 9, wherein the read command is a Host Performance Booster (HPB) read command carrying information regarding the second logical address and an HPB entry corresponding to the second logical address, and the HPB entry comprising information regarding a physical address that stores data of the second logical address.

12. The data processing method as claimed in claim 8, wherein the sub-region bit table is established after one or more HPB entries have been delivered to the host device.

13. The data processing method as claimed in claim 8, further comprising:

generating one or more HPB entries based on the second mapping table after the second mapping table has been updated based on the first mapping table; and delivering a packet comprising the one or more HPB entries to the host device.

14. The data processing method as claimed in claim 8, wherein the one or more sub-regions associated with each bit in the sub-region bit table are one or more sub-regions requested to be activated by the host device.

* * * * *